United States Patent
Moon et al.

(10) Patent No.: US 11,995,196 B2
(45) Date of Patent: May 28, 2024

(54) ELECTRONIC APPARATUS AND METHOD FOR CONTROLLING THEREOF

(71) Applicant: SAMSUNG ELECTRONICS CO., LTD., Suwon-si (KR)

(72) Inventors: Jijoong Moon, Suwon-si (KR); Wook Song, Suwon-si (KR); Sangjung Woo, Suwon-si (KR); Geunsik Lim, Suwon-si (KR); Jaeyun Jung, Suwon-si (KR); Myungjoo Ham, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 317 days.

(21) Appl. No.: 17/437,320

(22) PCT Filed: Nov. 24, 2020

(86) PCT No.: PCT/KR2020/016662
§ 371 (c)(1),
(2) Date: Sep. 8, 2021

(87) PCT Pub. No.: WO2021/221256
PCT Pub. Date: Nov. 4, 2021

(65) Prior Publication Data
US 2023/0144680 A1    May 11, 2023

(30) Foreign Application Priority Data

Apr. 29, 2020    (KR) .................. 10-2020-0052110

(51) Int. Cl.
*G06F 21/33* (2013.01)
*G06F 21/34* (2013.01)
(Continued)

(52) U.S. Cl.
CPC ......... *G06F 21/602* (2013.01); *G06N 3/0464* (2023.01); *G06N 3/08* (2013.01)

(58) Field of Classification Search
CPC .................... G06F 21/602; G06N 3/0464
(Continued)

(56) References Cited

U.S. PATENT DOCUMENTS 9,053,124 B1 * 6/2015 Dornquast .......... G06F 11/1453
10,419,221 B1    9/2019 Streit
(Continued)

FOREIGN PATENT DOCUMENTS

CN    109426861 A    3/2019
JP    2019-113761 A    7/2019
(Continued)

OTHER PUBLICATIONS

Nathan Dowlin; CryptoNets: Applying Neural Networks to Encrypted Data with High Throughput and Accuracy; MLR:2016; pp. 1-10.*
(Continued)

*Primary Examiner* — Monjur Rahim
(74) *Attorney, Agent, or Firm* — Sughrue Mion, PLLC

(57) ABSTRACT

An electronic apparatus and a method for controlling thereof are provided. The electronic apparatus includes a memory storing an artificial neural network and metadata including information of at least one layer in the artificial neural network, and a processor configured to: acquire a security vector based on the metadata and a security key of the electronic apparatus; map the security vector and the metadata with the security key and identification information of the artificial neural network; perform encryption on the at least one layer based on the metadata and the security vector; based on input data input to the artificial neural network, load the metadata and the security vector by using the security key and the identification information of the artificial neural network; and perform an operation between the input data and the encrypted at least one layer based on the loaded security vector and the metadata.

20 Claims, 10 Drawing Sheets

(51) Int. Cl.
  *G06F 21/60* (2013.01)
  *G06F 21/62* (2013.01)
  *G06N 3/0464* (2023.01)
  *G06N 3/08* (2023.01)

(58) Field of Classification Search
  USPC .......................................................... 713/190
  See application file for complete search history.

(56) References Cited

U.S. PATENT DOCUMENTS

| | | | |
|---|---|---|---|
| 10,587,776 B2 | 3/2020 | Kang et al. | |
| 2009/0020284 A1* | 1/2009 | Graf ........................ | E21B 44/00 166/250.15 |
| 2010/0250497 A1* | 9/2010 | Redlich ................ | H04L 63/105 707/661 |
| 2015/0340032 A1* | 11/2015 | Gruenstein ............ | G06N 3/045 704/232 |
| 2018/0165546 A1* | 6/2018 | Skans .................... | G06N 3/084 |
| 2019/0005375 A1 | 1/2019 | Mody et al. | |
| 2019/0042878 A1 | 2/2019 | Sheller et al. | |
| 2019/0098048 A1 | 3/2019 | Lumezanu et al. | |
| 2019/0199510 A1 | 6/2019 | Hoshizuki et al. | |
| 2019/0244138 A1 | 8/2019 | Bhowmick et al. | |
| 2019/0266603 A1 | 8/2019 | Desjardins et al. | |
| 2020/0019843 A1 | 1/2020 | Han et al. | |
| 2020/0036510 A1* | 1/2020 | Gomez .................. | G06N 3/045 |
| 2020/0042701 A1 | 2/2020 | Yang | |
| 2020/0097653 A1* | 3/2020 | Mehta .................... | G06N 3/045 |
| 2021/0342700 A1* | 11/2021 | Antic ...................... | G06N 3/08 |

FOREIGN PATENT DOCUMENTS

| | | |
|---|---|---|
| KR | 10-2018-0086436 A | 7/2018 |
| KR | 10-2019-0011180 A | 2/2019 |
| KR | 10-2019-0096295 A | 8/2019 |

OTHER PUBLICATIONS

Noura et al., "Design and Realization of a New Neural Block Cipher," 2015 International Conference on Applied Research in Computer Science and Engineering (ICAR), Oct. 2015 (Total 6 pages).

Li et al., "An End-to-End Encrypted Neural Network for Gradient Updates Transmission in Federated Learning," arXiv:1908.08340v1, Aug. 2019 (Total 8 pages).

Communication dated Mar. 21, 2021, issued by the International Searching Authority in counterpart International Application No. PCT/KR2020/016662 (PCT/ISA/210 and 237).

\* cited by examiner

ELECTRONIC APPARATUS AND METHOD FOR CONTROLLING THEREOF

CROSS-REFERENCE TO RELATED APPLICATION(S)

This application is a National Stage Entry of PCT Application No. PCT/KR2020/016662, filed on Nov. 24, 2020, which claims priority under 35 U.S.C. § 119(a) to Korean Patent Application No. 10-2020-0052110, filed on Apr. 29, 2020 in the Korean Intellectual Property Office, the disclosures of which are incorporated by reference herein in their entirety.

BACKGROUND

1. Field

The disclosure relates to an electronic apparatus and a method for controlling thereof, and more particularly, to an electronic apparatus that encrypts an artificial neural network based on a security key and meta data related to the artificial neural network and maintains security of data for which security is required, and a method for controlling thereof.

2. Description of Related Art

Artificial neural networks trained based on machine learning (e.g., deep learning) are being developed and utilized in various fields, and an artificial neural network can be optimized to suit the characteristic of a user who utilizes it. That is, an artificial neural network may store various kinds of data related to a user that can be derived as the user utilizes the artificial neural network, or it may be trained based on the data related to the user. Accordingly, in an artificial neural network, various kinds of data of a user may be included, and thus the security of an artificial neural network has become significantly important.

In a conventional method, an artificial neural network is encrypted and stored for securing the artificial neural network, and the encrypted artificial neural network is decrypted to utilize the artificial neural network. However, the conventional method of securing the artificial neural network has its limits where the cost and time consumption for decrypting an encrypted artificial neural network are substantial. In particular, in an embedded environment where calculation resources are relatively limited, it is not effective to perform operations for decrypting an encrypted artificial neural network.

Also, in the case of the conventional method, encryption and decryption were performed without accurately reflecting the characteristic of an artificial neural network, and thus an artificial neural network could not be effectively secured.

SUMMARY

Embodiments of the disclosure provide an electronic apparatus that encrypts at least one layer among a plurality of layers included in an artificial neural network based on a security key and meta data related to the artificial neural network, and a method for controlling thereof.

Additional aspects will be set forth in part in the description which follows, and in part, will be apparent from the description, or may be learned by practice of the presented embodiments.

According to an embodiment, there is provided an electronic apparatus including: a memory storing an artificial neural network and meta data including information of at least one layer among a plurality of layers included in the artificial neural network, and a processor. The processor is configured to: acquire a security vector based on the meta data and a security key of the electronic apparatus; map the acquired security vector and the meta data with the security key and identification information of the artificial neural network; perform encryption on the at least one layer among the plurality of layers based on the meta data and the security vector; based on input data being input to the artificial neural network, load the meta data and the security vector by using the security key and the identification information of the artificial neural network; and perform an operation between the input data and the encrypted at least one layer based on the loaded security vector and the meta data.

The processor is further configured to: identify a number of layers to be encrypted among the plurality of layers, an area to be encrypted in each of the layers to be encrypted, and a depth value of the area based on the meta data, and determine a size of the security vector based on the number of layers to be encrypted, the area to be encrypted in each of the layers to be encrypted, and the depth value of the area.

The processor is further configured to: acquire an element of the security vector corresponding to the size of the security vector by using the security key, and acquire the security vector by using the acquired element of the security vector.

The processor is further configured to: map the security key and the identification information of the artificial neural network with the security vector and the meta data by using a hash function.

The security key and the hash function are stored in the memory or a security area in the processor, and the processor is further configured to: based on the input data being input to the artificial neural network including an encrypted layer, load the identification information of the artificial neural network on the memory or the security area, and load the meta data and the security vector by applying the hash function to the identification information of the artificial neural network loaded on the memory or the security area, and the security key.

The processor is further configured to: based on identifying that a first area in a first layer among the plurality of layers is encrypted through the meta data, perform a multiplication operation between a weight located in the first area of the first layer and a reciprocal number of the security vector, and encrypt the first area in the first layer.

The processor is further configured to: based on the encrypted first layer being a convolution layer, perform the multiplication operation between a weight located in a second area which is a part of the first layer and the reciprocal number of the security vector, and encrypt the second area in the first layer.

The processor is further configured to: identify the at least one encrypted layer among the plurality of layers through the meta data, perform a multiplication operation between the input data input to the at least one encrypted layer and the security vector and acquire first middle data, and perform the multiplication operation between the acquired first middle data and a weight included in the at least one encrypted layer, and acquire first output data.

The processor is further configured to: based on the at least one encrypted layer being a convolution layer, perform the multiplication operation between the weight located in the second area and the security vector and acquire the first middle data, and output a result of the multiplication operation between the first middle data and the input data input to the at least one encrypted layer, as the first output data.

The electronic apparatus further includes: a communicator, and the processor is further configured to: based on information that an external apparatus has an authority to use the artificial neural network based on a user input, control the communicator to transmit information for using the artificial neural network to the external apparatus.

According to an embodiment, there is provided a method for controlling an electronic apparatus including a memory storing an artificial neural network and meta data including information of at least one layer among a plurality of layers included in the artificial neural network. The method includes: acquiring a security vector based on the meta data and a security key of the electronic apparatus; mapping the acquired security vector and the meta data with the security key and identification information of the artificial neural network; performing encryption on the at least one layer among the plurality of layers based on the meta data and the security vector; based on input data being input to the artificial neural network, loading the meta data and the security vector by using the security key and the identification information of the artificial neural network; and performing an operation between the input data and the encrypted at least one layer based on the loaded security vector and the meta data.

The acquiring the security vector includes: identifying a number of layers to be encrypted among the plurality of layers, an area to be encrypted in each of the layers to be encrypted, and a depth value of the area based on the meta data; and determining a size of the security vector based on the number of layers to be encrypted, the area to be encrypted in each of the layers to be encrypted, and the depth value of the area.

The acquiring the security vector includes: acquiring an element of the security vector corresponding to the size of the security vector by using the security key; and acquiring the security vector by using the acquired element of the security vector.

The mapping includes: mapping the security key and the identification information of the artificial neural network with the security vector and the meta data by using a hash function.

The security key and the hash function are stored in the memory or a security area in the processor of the electronic apparatus, and the loading includes: based on the input data being input to the artificial neural network including an encrypted layer, loading the identification information of the artificial neural network on the memory or the security area, and loading the meta data and the security vector by applying the hash function to the identification information of the artificial neural network loaded on the memory or the security area and the security key.

The controlling method further includes, based on identifying that a first area in a first layer among the plurality of layers is encrypted through the meta data, performing a multiplication operation between a weight located in the first area of the first layer and a reciprocal number of the security vector, and encrypting the first area in the first layer.

The controlling method further includes, based on the encrypted first layer being a convolution layer, performing the multiplication operation between a weight located in a second area which is a part of the first layer and the reciprocal number of the security vector, and encrypting the second area in the first layer.

The controlling method further includes: identifying the at least one encrypted layer among the plurality of layers through the meta data; performing a multiplication operation between the input data input to the at least one encrypted layer and the security vector and acquiring first middle data; and performing the multiplication operation between the acquired first middle data and a weight included in the at least one encrypted layer, and acquiring first output data.

The operation includes performing an element-wise multiplication between the input data and the encrypted at least one layer based on the loaded security vector and the meta data.

The processor is further configured to: generate random numbers based on the security key; determine a random number corresponding to the determined size of the security vector among the generated random numbers, as each element of the security vector.

Embodiments of the disclosure provide an electronic apparatus that can reduce an overhead for encryption by performing encryption on some of a plurality of layers included in an artificial neural network, and maintain security of the artificial neural network as the artificial neural network cannot be used in case there is no security key.

BRIEF DESCRIPTION OF THE DRAWINGS

The above and other aspects, features and advantages of certain embodiments of the disclosure will be more apparent from the following description taken in conjunction with the accompanying drawings in which.

DETAILED DESCRIPTION

Figure 1A:
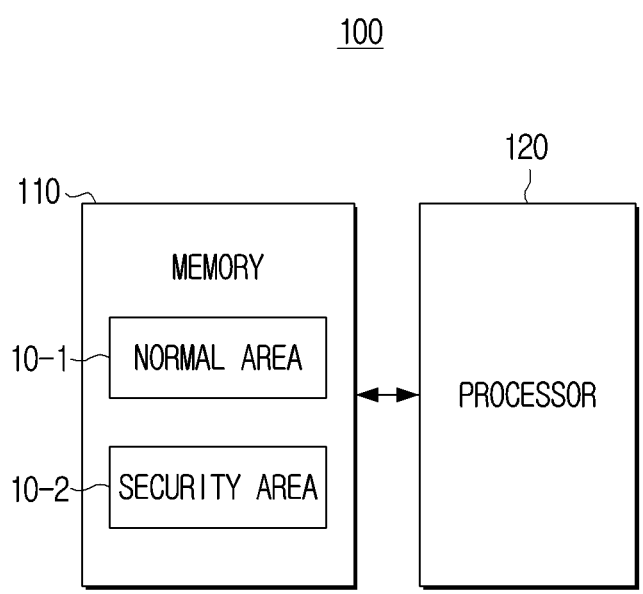
FIG. 1A is a block diagram for illustrating an electronic apparatus according to an embodiment of the disclosure.

The disclosure relates to an electronic apparatus 100 that encrypts weights included in some layers among a plurality of layers included in an artificial neural network by using an intrinsic security key of the electronic apparatus for maintaining security of information that requires security, such as personal information, and a method for controlling thereof. The electronic apparatus 100 encrypts at least one layer included in an artificial neural network, and thereby maintaining the security of the artificial neural network, and the security of information, such as personal information, that requires security when the artificial neural network utilizes such information as learning data, etc.

Specifically, the feature of maintaining security of an artificial neural network itself and maintaining security of information that requires security such as personal information may mean that, if specific data is input into an artificial neural network without utilizing an intrinsic security key of the electronic apparatus, the artificial neural network outputs invalid data. Here, the invalid data may mean data of which confidence score is smaller than a threshold value.

Also, as the artificial neural network is trained based on data that requires security such as personal information, etc., data output by the artificial neural network may be data to which data that requires security is reflected. Accordingly, when data is input by an abnormal method (e.g., a method of inputting data into the artificial neural network without using the security key, etc.), the artificial neural network outputs invalid data, and thus security of the artificial neural network itself can be maintained, and security of data that the artificial neural network uses as learning data can be maintained.

Therefore, according to one or more embodiments of the disclosure, if another terminal apparatus inputs data into the artificial neural network including an encrypted layer without using security data (e.g., a security vector, etc.) that can be acquired through the security key of the electronic apparatus 100, the encrypted artificial neural network included in the electronic apparatus 100 outputs invalid data, and thus security of the artificial neural network can be maintained, and security of personal information that the artificial neural network uses as learning data, etc. can be maintained.

As another example, the feature of maintaining security of the artificial neural network may mean performing control so that access to the artificial neural network is blocked without using the intrinsic security key of the electronic apparatus. That is, by preventing input data into the artificial neural network without using the security key, security for the artificial neural network can be maintained.

The intrinsic security key of the electronic apparatus 100 may include an intrinsic hardware key of the electronic apparatus 100 or a key that can be generated only in the electronic apparatus 100. As another example, the security key of the electronic apparatus 100 may include an intrinsic key allotted to the electronic apparatus 100 by a server that can manage the electronic apparatus 100 and provide various kinds of data (or, the server of the manufacturer of the electronic apparatus 100 or a server that can provide services to the electronic apparatus 100, etc.) so that a specific artificial neural network stored in the electronic apparatus 100 can be utilized. An embodiment wherein a server allots and provide a security key to the electronic apparatus 100 will be described in detail with reference to FIG. 5.

Also, the artificial neural network may generally refer to a machine learning model generated and trained to output data corresponding to input data. Also, the artificial neural network may not only be trained to be optimized for a specific job, but also trained to suit various demands such as a personalized purpose, etc.

Hereinafter, the disclosure will be described in detail with reference to the accompanying drawings.

FIG. 1A is a block diagram for illustrating an electronic apparatus 100 according to an embodiment of the disclosure. As illustrated in FIG. 1A, the electronic apparatus 100 may include a memory 110 and a processor 120. The components illustrated in FIG. 1A are only examples for implementing the embodiments of the disclosure, and appropriate hardware and software components obvious to a person skilled in the art can be additionally included in the electronic apparatus 100.

The memory 110 may store instructions or data related to at least one other component of the electronic apparatus 100. Also, the memory 110 may be accessed by the processor 120, and the processor 120 may perform reading, recording, correcting, deleting and updating of certain data.

In particular, the memory 110 may store an instruction set corresponding to at least one program that can be executed by the processor 120. An instruction may mean an action statement that can be executed by a processor in a programming language, and may be a minimum unit for execution or operation of a program.

The memory 110 may store data input through an inputter. For example, input data may include voice data input through a microphone or image data acquired through a camera. Also, input data may be data implemented as a vector or a matrix, but this is merely an example, and input data may be implemented as data in various forms such as a graph, etc.

The memory 110 may store an artificial neural network including a plurality of layers. The artificial neural network may include various kinds of layers such as a convolution layer, a fully connected layer, etc. In addition, each layer has a plurality of weight values, and can perform an operation of the layer through the operation result of the previous layer and the plurality of weight values in the current layer. The plurality of weight values included in the plurality of neural network layers of the artificial neural network may be optimized by a learning result of an artificial intelligence model. For example, the plurality of weight values may be updated such that a loss value or a cost value acquired at the artificial intelligence model during a learning process is reduced or minimized.

Some examples of artificial neural network may include a convolutional neural network (CNN), a deep neural network (DNN), a recurrent neural network (RNN), a restricted Boltzmann machine (RBM), a deep belief network (DBN), a bidirectional recurrent deep neural network (BRDNN), and deep Q-networks, etc., but the artificial neural network in the disclosure is not limited to the aforementioned examples.

The memory 110 may be divided into a normal area 10-1 and a security area 10-2. The normal area 10-1 may refer to an area wherein data and instructions related to various kinds of components of the electronic apparatus 100 are stored. The security area 10-2 may refer to a storage area wherein exchange of information with the normal area is controlled and security is reinforced. Accordingly, in the security area 10-2, personal information, payment information, biographical information, security documents, etc. that require security may be stored. As another example, in the security area 10-2, information on the security key and a security vector and the meta data corresponding to the security key and identification information of the artificial neural network (e.g., a hash table or a hash function to which a security vector and the meta data are mapped) may be stored. An embodiment related thereto will be described in the following description.

The security area 10-2 storing various kinds of information that require security may also be implemented as a component of the memory 110 as illustrated in FIG. 1A, but also may be implemented as an independent hardware module or software module, and also as a component of the processor 120.

The memory 110 may store meta data related to at least one layer to be encrypted among the plurality of layers included in the artificial neural network. Specifically, the meta data may include the number of layers to be encrypted among the plurality of layers, the types of the layers to be encrypted, the areas to be encrypted in the layers, and the depth values of the areas to be encrypted. The meta data may store information related to the layers to be encrypted in the form of a vector or a matrix, but these are only some examples, and the meta data may store the information in the form of a graph. The processor 120 may receive an input of meta data from a user or an external apparatus, but this is only an example, and the processor 120 may generate meta data by using a random number generator, and store the meta data in the memory 110.

Further, the memory 110 may store software modules that can perform various functions. For example, the memory 110 may store a training module 80 including a security vector generation module 80-1, a mapping module 80-2, and an encryption module 80-3, and may store an inference module 90 including a loading module 90-1 and an operation execution module 90-2. Operations of each module may be controlled by the processor 120. Each module may be stored in a non-volatile memory and loaded on a volatile memory by the processor 120. Operations of each software module will be described in detail with reference to FIG. 1D.

The term loading may mean an operation of calling in data stored in a non-volatile memory to a volatile memory and storing the data, so that the processor 120 can access the data. A volatile memory may be included in the processor 120 and implemented as a component of the processor 120, but this is merely an example, and a volatile memory may be implemented as a separate component from the processor 120.

The memory 110 may be implemented as a non-volatile memory, a volatile memory, a flash-memory, a hard disc drive (HDD) or a solid state drive (SDD), etc. Also, the memory 110 may include a read-only memory (ROM), a random access memory (RAM), or a memory card (e.g., a micro secure digital (SD) card, a memory stick) installed on the electronic apparatus 100. Also, in the memory 110, programs and data, etc. constituting various kinds of screens to be displayed in a display area of the display may be stored.

A non-volatile memory may refer to a memory that can maintain stored information even if power supply is stopped (e.g., a flash memory, a programmable read-only memory (PROM), a magnetoresistive random-access memory (MRAM), and a resistive RAM (RRAM)). A volatile memory may refer to a memory that is constantly supplied with power for maintaining stored information (e.g., a dynamic random-access memory (DRAM) and a static RAM (SRAM)).

The processor 120 may be electronically connected with the memory 110 and perform overall operations of the electronic apparatus 100. The processor 120 may include one or more processors. Here, the processor 120 may be a generic-purpose processor, such as a central processing unit (CPU), an application processor (AP), and a digital signal processor (DSP), a graphic-dedicated processor (e.g., a graphic processing unit (GPU)) and a vision processing unit (VPU), or an artificial intelligence-dedicated processor like a neural processing unit (NPU).

The processor 120 may load the meta data stored in the memory 110 and the security key stored in the security area 10-2 in the volatile memory. Here, the security area in the volatile memory may mean an area wherein exchange of information with other components inside the electronic apparatus 100 is controlled, and thus security is reinforced. The processor 120 may perform various kinds of security tasks (e.g., performing encryption on the artificial neural network, etc.) in the security area of the volatile memory. However, this is merely an example, and the processor 120 may be configured to perform various kinds of security related tasks in the normal area of the volatile memory.

The processor 120 may acquire a security vector by using the meta data and the security key. Specifically, the processor 120 may identify the number of layers to be encrypted among the plurality of layers included in the artificial neural network, the areas to be encrypted in the layers, and the depth values of the areas to be encrypted by using the meta data. The processor 120 may determine the size (or dimension) of the security vector based on the data identified from the meta data. The size of the security vector may be determined as (the number of layers to be encrypted)*(the areas to be encrypted)*(the depth values of the areas to be encrypted), but this is merely an embodiment, and the size may be modified in various ways.

The processor 120 may acquire an element of the security vector corresponding to the determined size of the security vector by using the security key. As an example, the processor 120 may modify the security key corresponding to the determined size of the security vector, and identify each of the modified security keys as an element of each security vector. For example, when the size of the security vector is 1×2, elements to be input (or mapped) to the security vector are two, the processor 120 may modify the security key by a predefined method and generate two modified security keys, identify each of the two modified security keys as an element of the security vector and map the element. The predefined method may include a method of generating a modified security key by applying a specific mapping function to the security key, a method of generating a modified security key by combining the security key and a generated random number, etc., but these are merely some example, and methods may be variously modified by a user.

As another example, the processor 120 may generate random numbers based on the security key, and determine a random number corresponding to the determined size of the security vector among the generated random numbers, as each element of the security vector. However, this is merely an example, and the processor 120 may generate and acquire an element of the security vector by various methods using the security key, and generate the security vector based on the generated and acquired element.

The processor 120 may map the acquired security vector and the meta data with the security key and the identification information of the artificial neural network. For example, the processor 120 may map the security key and the identification information of the artificial neural network with the security vector and the meta data by using a hash function. Here, the security key and the artificial neural network may be hash keys, and the security vector and the meta data may be hash values. That is, the processor 120 may map the security key and the identification information of the artificial neural network with the security vector and the meta data in the form of a hash table. Then, the processor 120 may store the security vector and the meta data mapped with the security key and the identification information of the artificial neural network in the security area 10-2 of the memory 110 or a security area implemented as a separate hardware module or software module. The identification information of the artificial neural network may include various kinds of information that can identify a specific artificial neural network (e.g., the number of an artificial neural network, the type of an artificial neural network, etc.).

The processor 120 may perform encryption on at least one layer among the plurality of layers by using the meta data and the security vector. The operation of encrypting a layer may not only include encrypting all weights included in the layer, but also encrypting weights included in some parts of the layer. After encrypting one or more layers or a part of a layer, the processor 120 may store the artificial neural network including the encrypted layer in the memory 110.

Specifically, the processor 120 may identify a layer or an area for which encryption will be performed among the plurality of layers through the meta data. If it is identified that a first layer among the plurality of layers is to be encrypted through the meta data, the processor 120 may perform a multiplication operation between a weight located in the first layer and a reciprocal number of the security vector, and thereby encrypting the first layer. For example, the processor 120 may perform an element-wise multiplication operation between the weight located in the first layer and the reciprocal number of the security vector. The processor 120 may encrypt the entire first layer by performing a multiplication operation between weights located in the entire area of the first layer and the reciprocal number of the security vector. Alternatively or additionally, the processor 120 may also encrypt only some areas of the first layer.

As another example, the processor 120 may identify the type of the first layer for which encryption will be performed among the plurality of layers through the meta data. In case the first layer is a convolution layer, the processor 120 may encrypt weights included in the entire first area of the first layer, but it may also encrypt only weights included in some areas of the first area. That is, the processor 120 may perform a multiplication operation between weights located in some areas and the reciprocal number of the security vector, and thereby encrypt some areas of the first layer.

When data is input into the artificial neural network including the encrypted layer, the processor 120 may load the meta data and the security vector by using the security key and the identification information of the artificial neural network. Specifically, when data is input into the artificial neural network including the encrypted layer, the processor 120 may load the identification information of the artificial neural network and the security key stored in the security area of the volatile memory. For example, the processor 120 may load the identification information of the artificial neural network stored in the normal area of the memory 110 and the security key stored in the security area of the memory 110 or a security area implemented as a separate hardware module or software module. The processor 120 may acquire the meta data and the security vector by applying a hash function to the security key and the identification information of the artificial neural network in the security area of the volatile memory. Then, the processor 120 may load the acquired meta data and security data on the normal area of the volatile memory.

The processor 120 may perform an operation between the input data and the encrypted at least one layer based on the security vector and the meta data. The feature of performing an operation between the input data and the layer may include a case of performing a multiplication operation between the input data and a weight included in the layer. The embodiment will be described with reference to FIG. 1B.

Figure 1B:
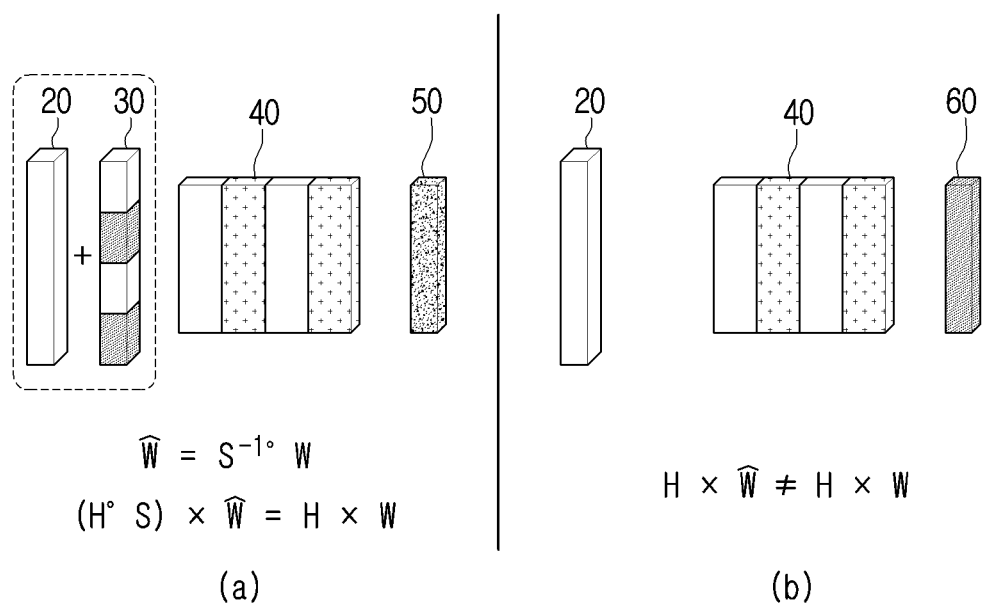
FIG. 1B and FIG. 1C are diagrams for illustrating operations of an electronic apparatus that performs encryption on an artificial neural network according to an embodiment of the disclosure.

FIG. 1B is a diagram for illustrating operations of an electronic apparatus that performs encryption on an artificial neural network according to an embodiment. Specifically, FIG. 1B is a diagram illustrating operations of the processor 120 that performs encryption on a layer and input data in a case where the layer is a fully connected layer.

As illustrated in (a) of FIG. 1B, the processor 120 may identify an encrypted layer 40 among the plurality of layers included in the artificial neural network by using the meta data. Then, the processor 120 may monitor whether data is input into the layer identified as being encrypted. If it is identified that the data is input to the encrypted layer, the processor 120 may perform an element-wise multiplication operation between the data 20 to be input into the encrypted layer 40 and the security vector 30 and acquire first middle data. Then, the processor 120 may perform a multiplication operation between the first middle data and the encrypted layer 40 and acquire first output data.

The encrypted at least one layer 40 is a layer which is a result of multiplying the previous layer with the reciprocal number of the security vector. Accordingly, the first output data is identical to the data acquired by performing a multiplication operation between the input data 20 and a weight included in the previous layer. This can be understood through the formula illustrated in (a) of FIG. 1B. The processor 120 may perform a multiplication operation between the previous layer W and the security vector S and acquire the encrypted layer ŵ 40. Then, the processor 120 may perform a multiplication operation between the input data H 20 and the security vector S 30 and acquire the first middle data H∘S, and perform a multiplication operation between the first middle data and the encrypted layer ŵ 40 and acquire the first output data H×W 50.

That is, the processor 120 may not decrypt the encrypted layer 40, but output the first output data through a simple multiplication operation with the first middle data in an encrypted state. As the overhead in the case of an operation of performing a simple element-wise multiplication operation is smaller than the overhead in the case of an operation of decrypting the layer, the electronic apparatus 100 according to an embodiment of the disclosure may perform an operation between the encrypted layer and the input data with small overhead.

Referring to (b) of FIG. 1B, if the data 20 is input into at least one layer 40 that is encrypted and the security vector is not loaded as there is no security key of the electronic apparatus 100, the processor 120 may output data 60 which is different from the first output data 50 shown in (a) of FIG. 1B. Here, the data 60 may not reflect accurate values as the input data 20 is not processed through the encrypted layer 40. Accordingly, the processor 120 may map the security key and the identification information of the artificial neural network with the security vector and the meta data, and thereby reinforce the security of the artificial neural network.

Figure 1C:
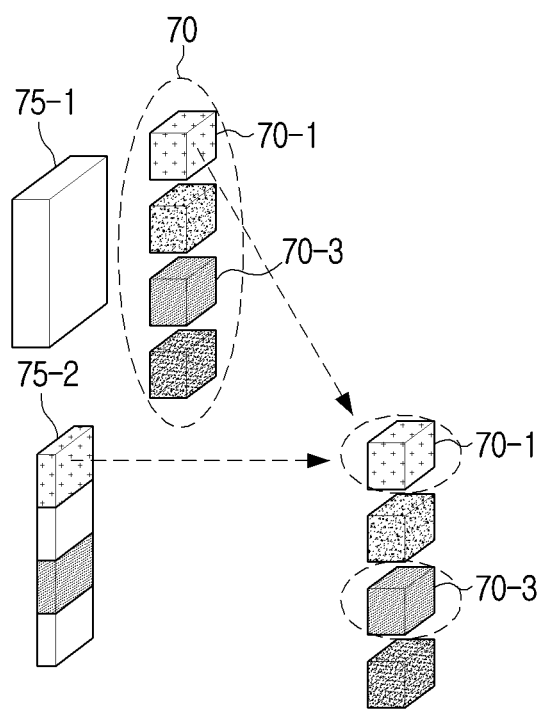

Referring to FIG. 1C, the encrypted layer 70 may be a convolution layer. When the encrypted layer is a convolution layer, the amount (or, the size) of the input data 75-1 may be bigger than the amount (or, the size) of the weights included in the areas of the encrypted layer. Accordingly, when the encrypted layer 70 is a convolution layer, the processor 120 may perform a multiplication operation between the encrypted areas 70-1, 70-3 of the encrypted layer 70 and the security vector 75-2 and acquire second middle data. Here, as a multiplication operation between the previous area and the reciprocal number of the security vector is performed in the encrypted areas 70-1, 70-3, the second middle data may be identical to the layer before the encrypted layer 70 is encrypted.

The processor 120 may perform an operation between the weight included in the second middle data and the input data 75-1 and acquire second output data. That is, the processor 120 may not decrypt the encrypted layer, but simply perform a multiplication operation between security vectors and acquire the second middle data, and perform a simple multiplication operation between the second middle data and the input data, and thereby reducing the overhead.

For example, when another terminal apparatus cannot load the security vector as there is no security key of the electronic apparatus 100 inputs data 75-1 into the layer 70 in which some areas of the layer 70 are encrypted, invalid data, which is different from the second output data, may be output. Accordingly, the processor 120 can reinforce the security of the artificial neural network by mapping the security key and the identification information of the artificial neural network with the security vector and the metadata.

If an external apparatus has an access authority for using the artificial neural network according to a user input, the processor 120 may control the communicator 130 to transmit information for using the artificial neural network to the external apparatus. The information for using the artificial neural network may include the security key of the electronic apparatus 100 and a mapping function (e.g., a hash function) that uses the security key and the identification information of the artificial neural network as keys. The external apparatus may utilize the encrypted artificial neural network by using the received information for using the artificial neural network. An embodiment related thereto will be described in detail with reference to FIG. 5.

In addition, functions related to artificial intelligence applied to an artificial neural network, etc. according to an embodiment may be operated through the processor 120 and the memory 110. The one or more processors may be configured to perform control to process input data according to a predefined operation rule or an artificial intelligence model stored in the memory. Alternatively, when the one or more processors are artificial intelligence-dedicated processors, the artificial intelligence-dedicated processors may be designed in a hardware structure specified for processing of a specific artificial intelligence model.

A predefined operation rule or an artificial intelligence model may be trained through learning data. That is, a basic artificial intelligence model is trained by using a plurality of learning data by a learning algorithm, and a predefined operation rule or an artificial intelligence model set to perform a desired characteristic (or performance) may be generated. Such learning may be performed in an apparatus in which artificial intelligence is performed in itself, or performed through a separate server and/or system. As examples of learning algorithms, there are supervised learning, unsupervised learning, semi-supervised learning, or reinforcement learning, but the learning algorithms are not limited to the aforementioned examples.

Figure 1D:
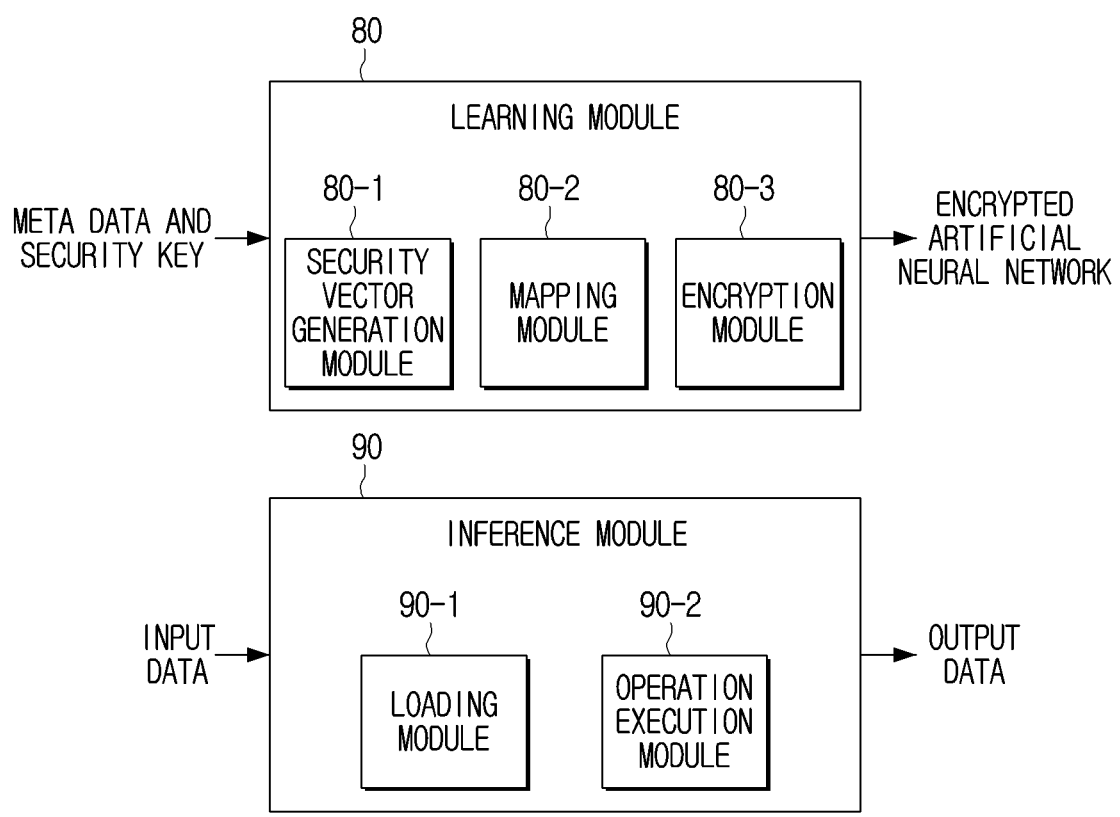
FIG. 1D is a diagram for illustrating operations of modules included in an electronic apparatus according to an embodiment of the disclosure.

FIG. 1D is a diagram illustrating operations of a plurality of software modules included in the electronic apparatus 100 according to an embodiment of the disclosure. As described above, the memory 110 of the electronic apparatus 100 may store a learning module 80 and an inference module 90. The processor 120 may be configured to control operations of each module. The learning module 80 may be a module that encrypts a plurality of layers included in the artificial neural network, and maps the encrypted layers with the security key. The learning module 80 may include a security vector generation module 80-1, a mapping module 80-2, and an encryption module 80-3. The inference module 90 may be a module that performs various kinds of loading operations and operations related to data input to the encrypted artificial neural network. The inference module 90 may include a loading module 90-1 and an operation execution module 90-2.

When the meta data and the security key are input, the learning module 80 may perform various kinds of operations and output the encrypted artificial neural network. Specifically, when the meta data and the security key are input, the security vector generation module 80-1 of the learning module 80 may generate a security vector by using the input meta data and security key. Specifically, the security vector generation module 80-1 may identify information for a layer to be encrypted among the plurality of layers by using the meta data, and determine the size of the security vector based on the identified information. Then, the security vector generation module 80-1 may modify the security key corresponding to the size of the security vector determined by a predefined method, map the modified security key, and generate a security vector.

The mapping module 80-2 of the learning module 80 may map the security key and the identification information of the artificial neural network with the security vector and the meta data. Specifically, the mapping module 80-2 may map the security key and the identification information of the artificial neural network with the security vector and the meta data by using a hash function. Then, the mapping module 80-2 may store the mapped security vector and the meta data in the security area of the memory 110.

The encryption module 80-3 of the learning module 80 may perform encryption on at least one layer among the plurality of layers included in the artificial neural network by using the meta data and the security vector. Specifically, the encryption module 80-3 may identify some or entire areas to be encrypted in one or more layers among the plurality of layers by using the meta data. Then, the encryption module 80-3 may perform a multiplication operation between weights included in the identified some or entire areas and the reciprocal number of the security vector, and thereby encrypting the some or entire areas. Accordingly, the encryption module 80-3 may output the artificial neural network wherein some or entire areas are encrypted.

Moreover, if data is input into the encrypted artificial neural network, the inference module 90 may output output data corresponding to the input data. Specifically, if input data is input into the encrypted artificial neural network, the loading module 90-1 of the inference module 90 may load the meta data and the security vector by using the security key and the identification information of the artificial neural network. For example, the loading module 90-1 may load the identification information of the artificial neural network on the security area in which the security key and the hash function are stored. Then, the loading module 90-1 may apply the hash function to the identification information of the artificial neural network loaded on the security area and the security key, and thereby load the meta data and the security vector.

The operation execution module 90-2 of the inference module 90 may perform an operation between the input data and the encrypted at least one layer based on the loaded security vector and the meta data, and output data. Specifically, the operation execution module 90-2 may identify an encrypted area among the plurality of layers through the meta data. Then, the operation execution module 90-2 may perform a multiplication operation between the data to be input into the identified encrypted area and the security vector and acquire first middle data. The operation execution module 90-2 may perform a multiplication operation between the first middle data and a weight included in the encrypted at least one layer and acquire first output data.

Figure 1E:
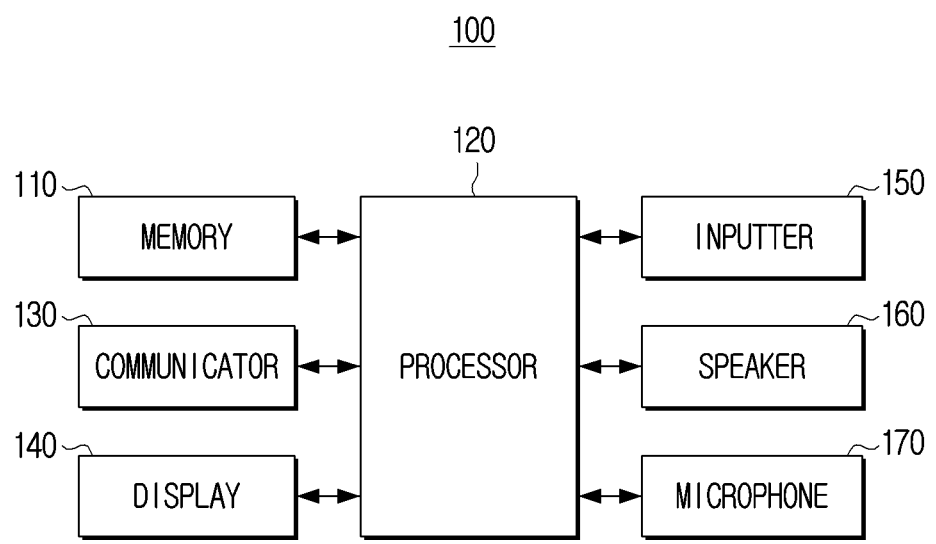
FIG. 1E is a block diagram illustrating an electronic apparatus according to an embodiment of the disclosure.

FIG. 1E is a block diagram illustrating an electronic apparatus 100 according to an embodiment of the disclosure. As illustrated in FIG. 1E, the electronic apparatus 100 may include a memory 110, a processor 120, a communicator 130, a display 140, an inputter 150, a speaker 160, and a microphone 170. As the memory 110 and the processor 120 have been described in detail with reference to FIG. 1A to FIG. 1C, overlapping explanation thereof will be omitted.

The communicator 130 may include a circuit, and perform communication with a server or an external apparatus. Specifically, the processor 120 may receive and transmit various kinds of data or information from a server or an external apparatus connected through the communicator 130. In particular, the communicator 130 may receive input data from an external server or an external apparatus, and receive information related to the security key allotted to the electronic apparatus 100.

The communicator 130 may include various communication modules for performing communication with an external apparatus or server. As an example, the communicator 130 may include a wireless communication module, and for example, it may include a cellular communication module using at least one of LTE, LTE Advanced (LTE-A), code division multiple access (CDMA), wideband CDMA (WCDMA), a universal mobile telecommunications system (UMTS), Wireless Broadband (WiBro), 5th generation (5G), or a Global System for Mobile Communications (GSM), etc. As another example, a wireless communication module may include, for example, at least one of wireless fidelity (WiFi), Bluetooth, or Bluetooth low energy (BLE).

The display 140 may be implemented as a liquid crystal display (LCD) panel, organic light emitting diodes (OLED), etc., and depending on cases, it may also be implemented as a flexible display, a transparent display, etc. Also, the display 140 may also be implemented as a touch screen together with a touch panel. However, the display 140 is not limited to the aforementioned implementations, and the display 140 may be implemented differently according to the type of the electronic apparatus 100.

Also, the display 140 may display various information by control of the processor 120. In particular, the display 140 may display an indicator indicating that encryption was performed or the security vector and the meta data were loaded. In addition, the display 140 may display input data input through the inputter 150 and output data output from the artificial neural network.

The inputter 150 may include a circuit, and the processor 120 may receive a user instruction or various data for controlling the operation of the electronic apparatus 100 through the inputter 150. The inputter 150 may include a touch sensor, a (digital) pen sensor, a pressure sensor, a key, etc. The touch sensor may use, for example, at least one method among a capacitive method, a decompression method, an infrared method, and an ultrasonic method.

As an example, the inputter 150 may receive input of meta data from a user. Also, the inputter 150 may receive input of various kinds of input data that can be input into the artificial neural network. The input data may include voice, text, image data, etc., but the disclosure is not limited to the aforementioned examples.

The speaker 160 is a component that outputs not only various kinds of audio data for which various processing jobs such as decoding or amplification, and noise filtering were performed by an audio processor, but also various kinds of notification sounds or voice messages. In particular, the speaker 160 may output a notification sound notifying that the artificial neural network was successfully encrypted by control of the processor 120, or output data including a voice output from the encrypted artificial neural network.

The microphone 170 is a component that can receive input of a voice from a user. That is, the microphone 170 may receive input of an instruction consisting of a voice input from a user, and transmit the input instruction to the processor 120. Also, the microphone 170 may receive input of voice data as input data for inputting into the artificial neural network. Meanwhile, the term user may refer to a person using an electronic apparatus or an apparatus using an electronic apparatus (e.g.: an artificial intelligence electronic apparatus).

The microphone 170 may be provided inside the electronic apparatus 100, but it may also be provided outside and electronically connected with the electronic apparatus 100. Also, in case the microphone 170 is provided outside, the microphone 170 may transmit a user voice signal generated through a wired/wireless interface (e.g., Wi-Fi, Bluetooth) to the processor 120.

Figure 2:
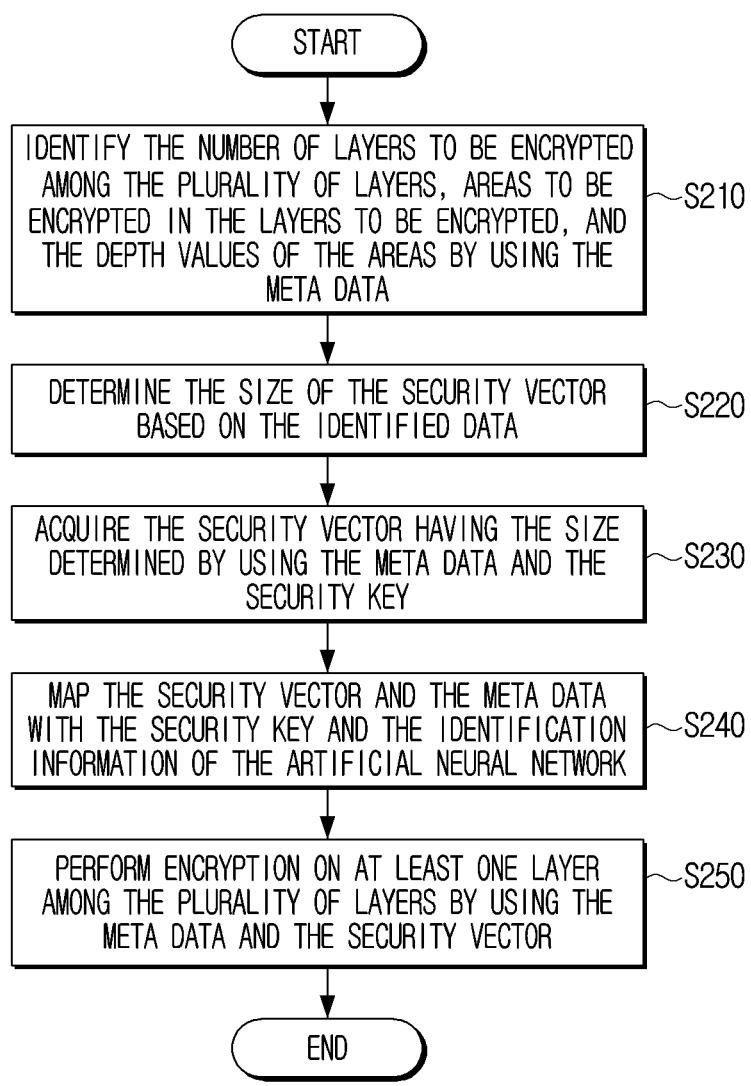
FIG. 2 is a flowchart for illustrating a process of encrypting an artificial neural network according to an embodiment of the disclosure.

FIG. 2 is a flowchart illustrating the operations of the electronic apparatus 100 performing encryption on the artificial neural network by using the security key and the meta data, and mapping the security vector and the meta data with the security key and the identification information of the artificial neural network.

In operation S210, the electronic apparatus 100 may identify the number of layers to be encrypted among the plurality of layers included in the artificial neural network, the areas to be encrypted in the layers to be encrypted, and the depth values of the areas to be encrypted by using the meta data. The depth values of the areas to be encrypted may be parameter values in a longitudinal direction of the areas to be encrypted. The meta data may include information on the layers to be encrypted among the plurality of layers included in the artificial neural network. Accordingly, the electronic apparatus 100 may identify various information regarding the layers to be encrypted through the meta data for generating the security vector.

For example, the electronic apparatus 100 may receive meta data from a user or an external apparatus. As another example, the electronic apparatus 100 may determine to encrypt at least one layer among the plurality of layers included in the artificial neural network, and generate meta data including information on the at least one layer to be encrypted.

The electronic apparatus 100 may determine at least one layer to be encrypted among the plurality of layers according to a predefined standard. For example, the electronic apparatus 100 may arbitrarily determine a layer to be encrypted. As another example, the electronic apparatus 100 may grant a weight to each layer to correspond to the data processing amount, and perform encryption on at least one layer among layers having high weights. However, this is merely an example, and the electronic apparatus 100 may determine a layer to be encrypted according to various predefined standards, and the predefined standards may be added/corrected/deleted by a user instruction.

In operation S220, the electronic apparatus 100 may determine the size (or, the dimension) of the security vector based on data identified through the meta data. As an example, the electronic apparatus 100 may determine (the size of the security vector as the number of layers to be encrypted)*(the areas to be encrypted)*(the depth values of the areas to be encrypted) (or, the parameter values in the direction of the depths of the areas to be encrypted), but this is merely an example, and the size may be determined by various methods.

In operation S230, the electronic apparatus 100 may acquire the security vector having a size determined by using the meta data and the security key. That is, specifically, the electronic apparatus 100 may modify the security key corresponding to the determined size of the security vector and determine elements to be mapped with the security vector. For example, in case the determined size of the security vector is 1×4, the elements of the security vector are four in total. Accordingly, the electronic apparatus 100 may modify the security key by a predefined method and acquire four data to be mapped with the security vector. Then, the electronic apparatus 100 may acquire the security vector by mapping the four data acquired by modifying the security key with the security vector.

However, this is merely an example, and the electronic apparatus 100 may acquire element data to be mapped with the security vector by using a random number generator. For example, when the determined size of the security vector is 1×4, the electronic apparatus 100 may acquire four random numbers by using the random number generator. Then, the electronic apparatus 100 may acquire the security vector by mapping the acquired four random numbers with the security vector.

In operation S240, the electronic apparatus 100 may map the security vector and the meta data with the security key and the identification information of the artificial neural network. Specifically, the electronic apparatus 100 may map the security key and the identification information of the artificial neural network with the security vector and the meta data by using a hash function. The security key and the identification information of the artificial neural network may be the key values in the hash function, and the hash values may be the security vector and the meta data. That is, if the security key of the electronic apparatus 100 and the identification information of the artificial neural network do not exist, the security vector and the meta data mapped with the security key and the artificial neural network may not be loaded. Accordingly, in the case of an external electronic apparatus having no security key, the mapped security vector and the artificial neural network may not be loaded. The electronic apparatus 100 may store the security vector and the meta data mapped by using the security key and the hash function in the memory 110 in the electronic apparatus 100 or the security area in the processor 120. Here, as described above, the security area may not only be implemented as a component of the memory 110 or the processor 120, but it may also be implemented as a separate hardware/software module.

However, the one or more embodiments are not limited thereto, and the electronic apparatus 100 may map the security key and the identification information of the artificial neural network with the security vector and the meta data by various mapping methods as well as a hash function.

In operation S250, the electronic apparatus 100 may perform encryption on at least one layer among the plurality of layers by using the meta data and the security vector. The electronic apparatus 100 may store the encrypted artificial neural network. Here, the electronic apparatus 100 may perform encryption on the entire weights or some weights included in the layer.

Specifically, the electronic apparatus 100 may identify an area to be encrypted among the plurality of layers included in the artificial neural network through the meta data. For example, if it is identified that the first area in the first layer among the plurality of layers is encrypted, the electronic apparatus 100 may perform a multiplication operation between the weight included in the first area in the first layer and the reciprocal number of the security vector, and thereby encrypt the first area in the first layer. Here, the first area may be the entire area of the first layer, but the scope of the area may be changed by a user instruction.

The electronic apparatus 100 may identify the type of the layer to be encrypted among the plurality of layers through the meta data. In case the at least one layer identified to be encrypted through the meta data is a convolution layer, the electronic apparatus 100 may perform a multiplication operation between the weight included in the second area which is a part of the first area and the reciprocal number of the security vector, and thereby encrypt the second area in the first layer. Referring to FIG. 1C, the electronic apparatus 100 may perform a multiplication operation between the weights included in the second areas 70-1, 70-3 which are parts of the first layer and the reciprocal number of the security vector, and thereby encrypt the second areas in the first layer.

Figure 3:
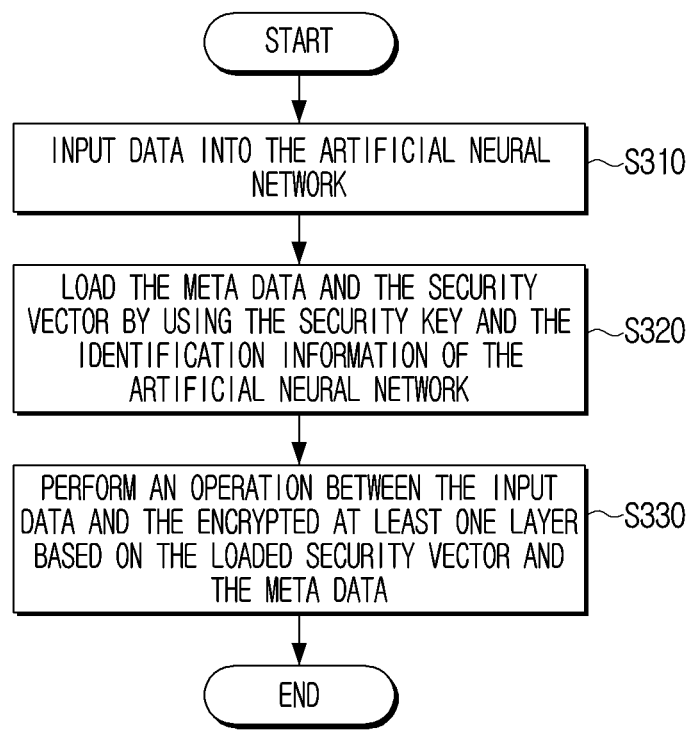
FIG. 3 is a flowchart illustrating operations of an electronic apparatus according to an embodiment of the disclosure.

FIG. 3 is a flowchart illustrating operations of the electronic apparatus 100 according to an embodiment of the disclosure.

In operation S310, the electronic apparatus 100 may input data input from a user or an external apparatus into the artificial neural network. The data input into the artificial neural network may be voice data, text data, and image or video data, etc., but is not limited thereto.

In operation S320, the electronic apparatus 100 may load the meta data and the security vector by using the security key and the identification information of the artificial neural network. Specifically, the electronic apparatus 100 may load the identification information of the artificial neural network stored in the memory 110 or the security key stored in the memory 110 or the security area of the processor 120 on the security area of the volatile memory. Then, the electronic apparatus 100 may acquire the mapped meta data and security vector by applying a hash function to the security key and the identification information of the artificial neural network in the security area of the volatile memory.

In operation S330, the electronic apparatus 100 may perform an operation between data input into the artificial neural network and the encrypted at least one layer based on the loaded security vector and the meta data. Specifically, the electronic apparatus 100 may identify the encrypted layer among the plurality of layers through the meta data.

The electronic apparatus 100 may monitor whether the data is input into the layer identified as being encrypted. If it is identified that the layer is encrypted, the electronic apparatus 100 may perform an element-wise multiplication operation between the layer identified as encrypted and the security vector, and acquire first middle data. Thereafter, the electronic apparatus 100 may perform an element-wise multiplication operation based on the first middle data and a weight included in the encrypted at least one layer and acquire first output data. Here, the encrypted at least one layer is encrypted according to a multiplication operation between a previous layer and the reciprocal number of the security vector. The previous layer may be a layer preceding the layer identified as being encrypted in an ordered sequence. Accordingly, the first output data acquired by performing a multiplication operation between the first middle data and the encrypted at least one layer is identical to the data acquired by performing a multiplication operation between the input data and the previous layer.

When the encrypted layer is a convolution layer, the size of the input data may be bigger than the size of the weight included in the layer. Accordingly, the electronic apparatus 100 may perform a multiplication operation between the encrypted layer and the input data by a different method. Specifically, in case the second area in the convolution layer was encrypted, the electronic apparatus 100 may perform an element-wise multiplication operation between the security vector and the weight located in the second area and acquire the second middle data. The electronic apparatus 100 may perform an element-wise multiplication operation between the second middle data and the input data, and acquire the second output data. As the second area is an area in which a multiplication operation with the reciprocal number of the security vector was performed, the second middle data may be the same layer as the previous layer. Accordingly, when an element-wise multiplication operation between the second middle data and the input data is performed, the result is identical to the result of performing an element-wise multiplication operation between the previous layer and the input data.

Figure 4:
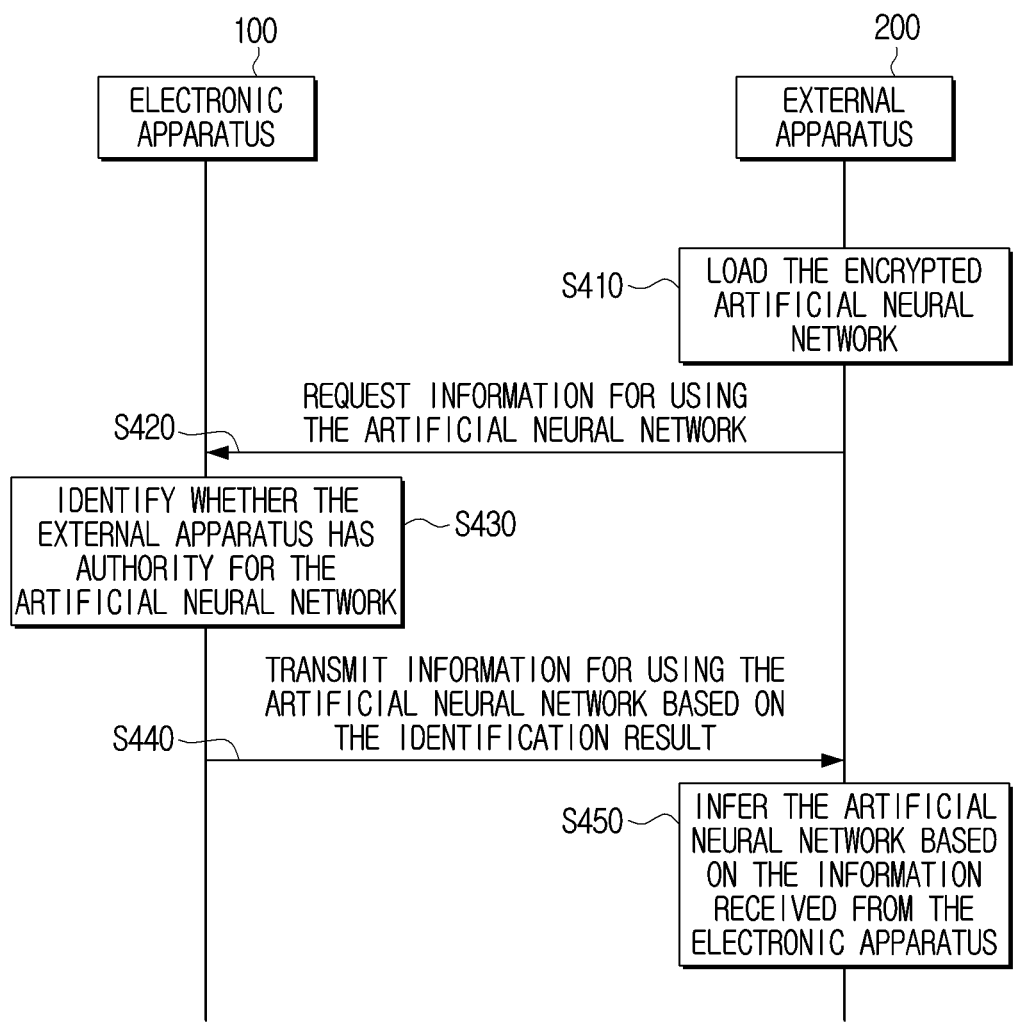
FIG. 4 is a sequence diagram for illustrating an operation between an electronic apparatus and an external apparatus according to an embodiment of the disclosure.

FIG. 4 is a sequence diagram for illustrating an operation between the electronic apparatus 100 and an external apparatus according to an embodiment of the disclosure.

In operation S410, an external apparatus 200 may load an encrypted artificial neural network on a volatile memory of the external apparatus 200 or a hardware or software module that can process various kinds of operations. Here, the encrypted artificial neural network is an artificial neural network that the electronic apparatus 100 encrypted based on the security key of the electronic apparatus 100. As an example, the external apparatus 200 may have received in advance the encrypted artificial neural network from the electronic apparatus 100. As another example, in case the electronic apparatus 100 uploaded an encrypted artificial neural network on a specific storage area (e.g., a web cloud server, a portal site server, etc.), the external apparatus 200 may download the encrypted artificial neural network from the specific storage area.

In operation S420, the external apparatus 200 may transmit a signal requesting information for using the encrypted artificial neural network to the electronic apparatus 100. That is, the external apparatus 200 may request information for using the artificial neural network to the electronic apparatus 100 for outputting valid data by using the encrypted artificial neural network. Here, in the request signal that the external apparatus 200 transmits to the electronic apparatus 100, identification information that can identify the external apparatus 200 (e.g., the model name and the model number of the external apparatus 200, information on the user, etc.) and the like may be included.

When a signal requesting information for using an artificial neural network is received from the external apparatus 200, the electronic apparatus 100 may identify whether authority for the artificial neural network exists in the external apparatus 200 in operation S430. Specifically, the electronic apparatus 100 may identify whether authority for the artificial neural network exists in the external apparatus 200 based on identification information of the external apparatus 200 included in the request signal received from the external apparatus 200. For example, the electronic apparatus 100 may identify that the apparatus that transmitted the request signal is the external apparatus 200 through the identification information included in the received request signal. Then, the electronic apparatus 100 may identify whether the user set the external apparatus 200 as an apparatus that can access the artificial neural network. Here, the electronic apparatus 100 may store information on types of external apparatuses that can access the artificial neural network.

The electronic apparatus 100 may transmit the information for using the artificial neural network based on the identification result in operation S440. That is, when the user set the external apparatus 200 as an apparatus that can access the artificial neural network, the electronic apparatus 100 may identify that authority for the artificial neural network exists in the external apparatus 200. Here, the information for using the artificial neural network may include the security key of the electronic apparatus 100 and a mapping function (e.g., a hash function, etc.) that uses the security key and the identification information of the artificial neural network as keys. Here, the mapping function may be a function that outputs the security vector and the meta data when the security key and the identification information of the artificial neural network are input as keys.

The external apparatus 200 may infer the artificial neural network based on information received from the electronic apparatus 100 in operation S450. Here, the feature of inferring the artificial neural network may include utilizing the artificial neural network such as acquiring output data by inputting data into the artificial neural network. Specifically, the external apparatus 200 may load the security vector and the meta data by applying the security key and the identification information of the artificial neural network to the mapping function. Then, the external apparatus 200 may perform an operation between the input data and the encrypted artificial neural network by using the loaded security vector and the meta data. The external apparatus 200 performs an operation between the input data and the artificial neural network that is identical to the operations performed by the electronic apparatus 100 in FIG. 1A and FIG. 3. Therefore, overlapping explanation thereof will be omitted.

Figure 5:
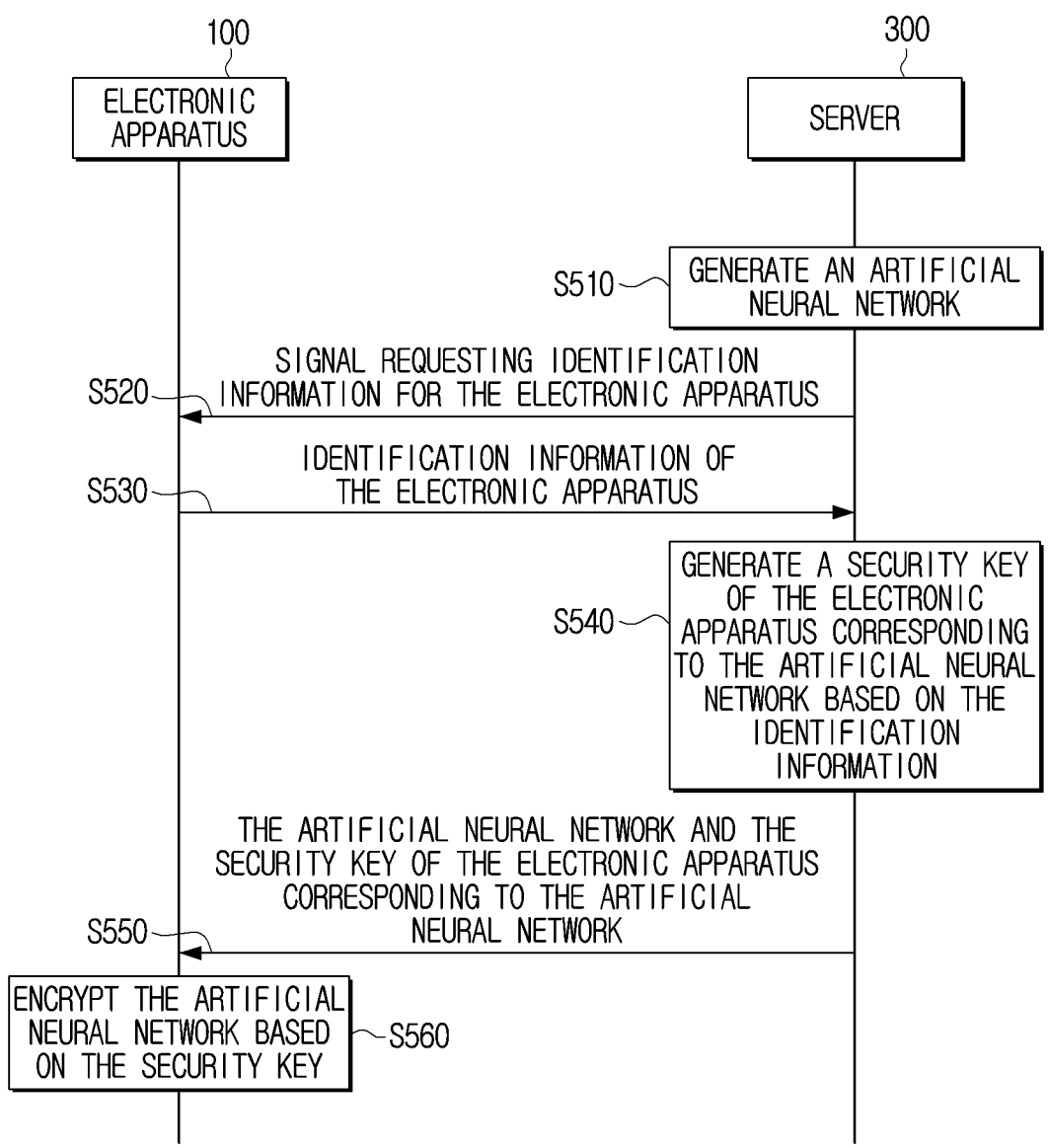
FIG. 5 is a sequence diagram for illustrating an operation between an electronic apparatus and a server according to an embodiment of the disclosure.

FIG. 5 is a sequence diagram for illustrating an operation between the electronic apparatus 100 and the server 300 according to an embodiment of the disclosure. Here, the server 300 may include at least one of a server that can manage the electronic apparatus 100 and provide various kinds of data, the server of the manufacturer of the electronic apparatus 100, or a server that can provide services to the electronic apparatus 100.

The server 300 may generate an artificial neural network that outputs output data by applying various artificial intelligence algorithms to input data in operation S510. Specifically, the server 300 may generate an artificial neural network based on a user input, etc., and it may also receive an artificial neural network from an external apparatus, etc.

The server 300 may transmit a signal requesting identification information for the electronic apparatus 100 to the electronic apparatus 100 in operation S520. Here, the identification information for the electronic apparatus 100 may mean information that can identify the electronic apparatus 100, and as examples of the identification information, an intrinsic hardware key, a model number, a serial number, and an international mobile equipment identity (IMEI) number, etc. may be included, but the identification information is not limited thereto.

When a signal requesting identification information is received from the server 300, the electronic apparatus 100 may transmit the identification information of the electronic apparatus 100 to the server 300 in operation S530. The server 300 may generate a security key of the electronic apparatus 100 corresponding to the artificial neural network based on the identification information received from the electronic apparatus 100 in operation S540. Specifically, the server 300 may generate a security key that can encrypt the artificial neural network through an encryption module based on the identification information of the electronic apparatus 100.

The server 300 may transmit the artificial neural network and the security key of the electronic apparatus 100 corresponding to the artificial neural network to the electronic apparatus 100 in operation S550. The electronic apparatus 100 may receive the artificial neural network and the security key and encrypt the artificial neural network based on the received security key in operation S560. The method by which the electronic apparatus 100 encrypts the artificial neural network based on the security key have been described above. Therefore, overlapping descriptions thereof will be omitted.

Figure 6:
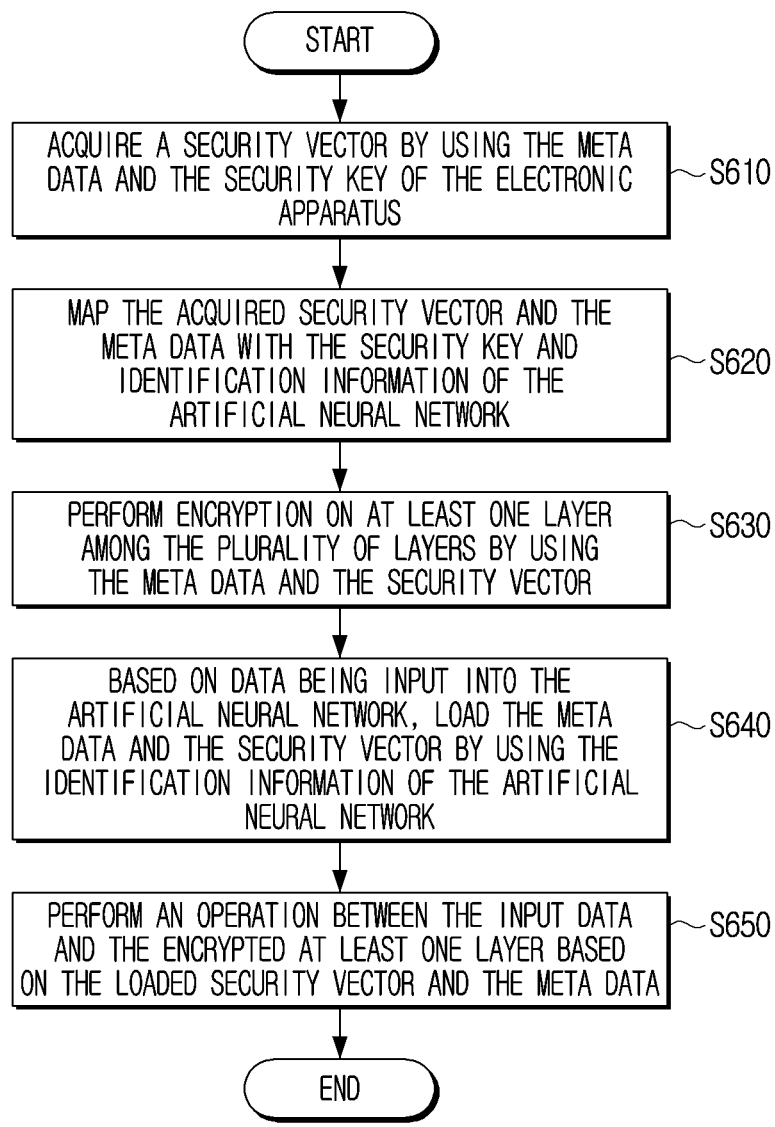
FIG. 6 is a flowchart illustrating an operation of an electronic apparatus according to an embodiment of the disclosure.

FIG. 6 is a flowchart illustrating a method of controlling the electronic apparatus 100 according to an embodiment of the disclosure.

In operation S610, the electronic apparatus 100 may acquire the security vector by using the meta data and the security key of the electronic apparatus 100. Specifically, the electronic apparatus 100 may determine the size of the security vector by using the meta data. Then, the electronic apparatus 100 may acquire element data to be input into the security vector by using the security key, identify data corresponding to the determined size of the vector in the acquired element data, and acquire the security vector.

In operation S620, the electronic apparatus 100 may map the acquired security vector and the meta data with the security key and the identification information of the artificial neural network. As an example, the electronic apparatus 100 may map the security key and the identification information of the artificial neural network with the security vector and the meta data by using a hash function. The security key and the hash function may be stored in the security area of the electronic apparatus 100.

In operation S630, the electronic apparatus 100 may perform encryption on at least one layer among the plurality of layers included in the artificial neural network by using the meta data and the security vector. Specifically, the electronic apparatus 100 may identify a layer to be encrypted among the plurality of layers included in the artificial neural network through the meta data. Then, the electronic apparatus 100 may encrypt the identified layer by performing a multiplication operation between a weight included in the identified layer and the reciprocal number of the security vector.

In operation S640, when data is input into the artificial neural network, the electronic apparatus 100 may load the meta data and the security vector by using the security key and the identification information of the artificial neural network. As an example, the electronic apparatus may load the mapped security vector and the meta data by applying a hash function to the identification information of the artificial neural network and the security key.

In operation S650, the electronic apparatus 100 may perform an operation between the input data and the encrypted at least one layer based on the loaded security vector and the meta data. As an example, the electronic apparatus 100 may identify the encrypted at least one layer among the plurality of layers through the meta data. Then, the electronic apparatus 100 may monitor whether data is input into the at least one layer identified to have been encrypted. If it is identified that data was input into the at least one layer identified to have been encrypted, the electronic apparatus 100 may perform a multiplication operation between the at least one layer identified as having been encrypted and the security vector and acquire first middle data. Then, the electronic apparatus 100 may perform a multiplication operation between the acquired first middle data and a weight included in the encrypted at least one layer and acquire first output data.

As another example, when the encrypted at least one layer is a convolution layer, the electronic apparatus 100 may perform a multiplication operation between a weight located in the encrypted area and the security vector and acquire second middle data. Then, the electronic apparatus 100 may output a multiplication operation between the second middle data and the data input into the encrypted layer and acquire second output data.

It should be noted that the drawings accompanying the embodiments of the disclosure are not for limiting the embodiments described in the disclosure to a specific embodiment, but they should be construed as including various modifications, equivalents, and/or alternatives of the embodiments of the disclosure. Also, with respect to the detailed description of the drawings, similar components may be designated by similar reference numerals.

In addition, in the disclosure, expressions such as "comprise," "have," and "include" should be construed encompassing characteristics (e.g., elements such as numerical values, functions, operations, and components) that are not listed, and the expressions are not intended to exclude the existence of additional characteristics.

The expressions "at least one of a, b or c" indicates only a, only b, only c, both a and b, both a and c, both b and c, or all of a, b, and c.

The expressions "first," "second," and the like used in the disclosure may be used to describe various elements regardless of any order and/or degree of importance. In addition, such expressions are used only to distinguish one element from another element, and are not intended to limit the elements.

In the disclosure, when one element (e.g., a first element) is "(operatively or communicatively) coupled with/to" or "connected to" another element (e.g., a second element), it should be interpreted to include one element being directly coupled to the another element, and the one element being coupled to the another element through still another element (e.g., a third element). In addition, the description that one element (e.g., a first element) is "directly coupled" or "directly connected" to another element (e.g., a second element) may be mean that still another element (e.g., a third element) does not exist between the one element and the another element.

In addition, the expression "configured to" used in the disclosure may be interchangeably used with other expressions such as "suitable for," "having the capacity to," "designed to," "adapted to," "made to" and "capable of". The term "configured to" does not necessarily mean that a device is "specifically designed to" in terms of hardware. Instead, under some circumstances, the expression "a device configured to" may mean that the device "is capable of" performing an operation together with another device or component. For example, the phrase "a sub-processor configured to perform A, B, and C" may mean a dedicated processor (e.g., an embedded processor) for performing the corresponding operations, or a generic-purpose processor (e.g., a CPU or an application processor) that can perform the corresponding operations by executing one or more software programs stored in a memory device.

The electronic apparatus 100 and an external apparatus according to the various embodiments of the disclosure may include, for example, at least one of a smartphone, a tablet PC, a desktop PC, a laptop PC, a netbook computer, a server, a PDA, a medical instrument, or a wearable device. In some embodiments, the electronic apparatus may include, for example, at least one of a television, a refrigerator, an air conditioner, an air purifier, a set top box, or a media box (e.g.: Samsung HomeSync™, Apple TV™, or Google TV™).

The various embodiments of the disclosure may be implemented as software including instructions stored in a machine-readable storage medium which can be read by machines (e.g., computers). The machines refer to apparatuses that call instructions stored in a storage medium, and can operate according to the called instructions, and the apparatuses may include an electronic apparatus according to the aforementioned embodiments (e.g., an electronic apparatus 100). When an instruction is executed by a processor, the processor may perform a function corresponding to the instruction by itself, or by using other components under its control. An instruction may include code that is generated or executed by a compiler or an interpreter. A storage medium that is readable by machines may be provided in the form of a non-transitory storage medium. Here, the term 'a non-transitory storage medium' only means that a storage medium does not include signals, and is tangible, but does not indicate whether data is stored in the storage medium semi-permanently or temporarily. For example, 'a non-transitory storage medium' may include a buffer wherein data is temporarily stored.

Also, according to an embodiment of the disclosure, the method according to the various embodiments described in the disclosure may be provided while being included in a computer program product. A computer program product refers to a product, and it can be traded between a seller and a buyer. A computer program product can be distributed in the form of a storage medium that is readable by machines (e.g.: a compact disc read only memory (CD-ROM)), or may be distributed on-line through an application store (e.g.: Play Store™). In the case of on-line distribution, at least a portion of a computer program product (e.g.: a downloadable app) may be stored in a storage medium such as the server of the manufacturer, the server of the application store, and the memory of the relay server at least temporarily, or may be generated temporarily.

In addition, each of the components according to the various embodiments of the disclosure (e.g., a module or a program) may consist of a singular object or a plurality of objects. Also, among the aforementioned corresponding sub components, some sub components may be omitted, or other sub components may be further included in the various embodiments. Alternatively or additionally, some components (e.g., a module or a program) may be integrated as an object, and perform the functions that were performed by each of the components before integration identically or in a similar manner. Operations performed by a module, a program, or other components according to the various embodiments may be executed sequentially, in parallel, repetitively, or heuristically. Or, at least some of the operations may be executed in a different order or omitted, or other operations may be added.

What is claimed is:

1. An electronic apparatus comprising:
a memory storing an artificial neural network and meta data including information of at least one layer among a plurality of layers included in the artificial neural network; and
a processor configured to:
acquire a security vector based on the meta data and a security key of the electronic apparatus;
map the acquired security vector and the meta data with the security key and identification information of the artificial neural network;
identify an area to be encrypted among a plurality of areas in each of the at least one layer among the plurality of layers based on the meta data and the security vector;
perform encryption on the identified areas in each of the at least one layer among the plurality of layers to be encrypted;
based on input data being input to the artificial neural network, load the meta data and the security vector by using the security key and the identification information of the artificial neural network; and
perform an operation between the input data and the encrypted at least one layer based on the loaded security vector and the meta data.

2. The electronic apparatus of claim 1,
wherein the processor is further configured to:
identify a number of layers to be encrypted among the plurality of layers, and a depth value of the area based on the meta data, and
determine a size of the security vector based on the number of layers to be encrypted, the area to be encrypted in each of the layers to be encrypted, and the depth value of the area.

3. The electronic apparatus of claim 2,
wherein the processor is further configured to:
acquire an element of the security vector corresponding to the size of the security vector by using the security key, and
acquire the security vector by using the acquired element of the security vector.

4. The electronic apparatus of claim 1,
wherein the processor is further configured to:
map the security key and the identification information of the artificial neural network with the security vector and the meta data by using a hash function.

5. The electronic apparatus of claim 4,
wherein the security key and the hash function are stored in the memory or a security area in the processor, and
wherein the processor is further configured to:
based on the input data being input to the artificial neural network including an encrypted layer, load the identification information of the artificial neural network on the memory or the security area, and load the meta data and the security vector by applying the hash function to the identification information of the artificial neural network loaded on the memory or the security area, and the security key.

6. The electronic apparatus of claim 1,
wherein the processor is further configured to:
based on identifying that a first area in a first layer among the plurality of layers is encrypted through the meta data, perform a multiplication operation between a weight located in the first area of the first layer and a reciprocal number of the security vector, and encrypt the first area in the first layer.

7. The electronic apparatus of claim 6,
wherein the processor is further configured to:
based on the encrypted first layer being a convolution layer, perform the multiplication operation between a weight located in a second area which is a part of the first layer and the reciprocal number of the security vector, and encrypt the second area in the first layer.

8. The electronic apparatus of claim 1,
wherein the processor is further configured to:
identify the at least one encrypted layer among the plurality of layers through the meta data,
perform a multiplication operation between the input data input to the at least one encrypted layer and the security vector and acquire first middle data, and
perform the multiplication operation between the acquired first middle data and a weight included in the at least one encrypted layer, and acquire first output data.

9. The electronic apparatus of claim 7,
wherein the processor is further configured to:
based on the at least one encrypted layer being a convolution layer, perform the multiplication operation between the weight located in the second area and the security vector and acquire the first middle data, and
output a result of the multiplication operation between the first middle data and the input data input to the at least one encrypted layer, as the first output data.

10. The electronic apparatus of claim 1, comprising:
a communicator,
wherein the processor is further configured to:
based on information that an external apparatus has an authority to use the artificial neural network based on a user input, control the communicator to transmit information for using the artificial neural network to the external apparatus.

11. The electronic apparatus of claim 1, wherein the processor is further configured to:
identify a number of layers to be encrypted among the plurality of layers based on the meta data, and
determine a size of the security vector based on the number of layers to be encrypted.

12. The electronic apparatus of claim 1, wherein the processor is further configured to determine a size of the security vector based on the area to be encrypted in each of the at least one layer to be encrypted.

13. The electronic apparatus of claim 1, wherein the processor is further configured to:
identify a depth value of the area based on the meta data, and
determine a size of the security vector based on the depth value of the area.

14. The electronic apparatus of claim 1, wherein the processor is further configured to perform the encryption at a layer level of the artificial neural network by encrypting a first layer among the plurality of layers based on the meta data and the security vector.

15. The electronic apparatus of claim 1, wherein the processor is further configured to perform the encryption on a first layer among the plurality of layers based on the meta data and the security vector uniquely corresponding to the first layer.

16. A method for controlling an electronic apparatus including a memory storing an artificial neural network and meta data including information of at least one layer among a plurality of layers included in the artificial neural network, the method comprising:
acquiring a security vector based on the meta data and a security key of the electronic apparatus;
mapping the acquired security vector and the meta data with the security key and identification information of the artificial neural network;
identifying an area to be encrypted among a plurality of areas in each of on the at least one layer among the plurality of layers by using the meta data and the security vector;
performing encryption on the identified areas in each of the at least one layer among the plurality of layers to be encrypted;
based on input data being input to the artificial neural network, loading the meta data and the security vector by using the security key and the identification information of the artificial neural network; and
performing an operation between the input data and the encrypted at least one layer based on the loaded security vector and the meta data.

17. The controlling method of the electronic apparatus of claim 16,
wherein the acquiring the security vector comprises:
identifying a number of layers to be encrypted among the plurality of layers, and a depth value of the area based on the meta data; and
determining a size of the security vector based on the number of layers to be encrypted, the area to be encrypted in each of the layers to be encrypted, and the depth value of the area.

18. The controlling method of the electronic apparatus of claim 17,
wherein the acquiring the security vector comprises:
acquiring an element of the security vector corresponding to the size of the security vector by using the security key; and
acquiring the security vector by using the acquired element of the security vector.

19. The controlling method of the electronic apparatus of claim 16,
wherein the mapping comprises:
mapping the security key and the identification information of the artificial neural network with the security vector and the meta data by using a hash function.

20. The controlling method of the electronic apparatus of claim 19,
wherein the security key and the hash function are stored in the memory or a security area in the processor of the electronic apparatus, and
wherein the loading comprises:
based on the input data being input to the artificial neural network including an encrypted layer, loading the identification information of the artificial neural network on the memory or the security area, and loading the meta data and the security vector by applying the hash function to the identification information of the artificial neural network loaded on the memory or the security area and the security key.

* * * * *